United States Patent [19]

Reynolds et al.

[11] 4,159,310

[45] Jun. 26, 1979

[54] PROCESS FOR RECOVERING ALUMINUM AND OTHER METAL VALUES FROM FLY ASH

[75] Inventors: James E. Reynolds, Golden; Alan R. Williams, Denver, both of Colo.

[73] Assignee: Public Service Company of New Mexico, Albuquerque, N. Mex.

[21] Appl. No.: 873,400

[22] Filed: Jan. 30, 1978

[51] Int. Cl.$^2$ .................. C01G 23/02; C01F 7/56; C01G 49/10; C01B 33/08

[52] U.S. Cl. .................................. 423/78; 423/79; 423/76; 423/135; 423/136; 423/149; 423/343; 423/155; 423/166; 423/481

[58] Field of Search .............. 423/76, 135, 136, 149, 423/343, 77, 78, 79; 75/112

[56] References Cited

U.S. PATENT DOCUMENTS

| | | | |
|---|---|---|---|
| 1,147,832 | 7/1915 | Kugelgen et al. | 423/136 |
| 1,600,216 | 9/1926 | Dearborn | 423/136 |
| 1,605,098 | 11/1926 | Dearborn | 423/136 |
| 1,866,731 | 7/1932 | Staib | 423/136 |
| 1,875,105 | 8/1932 | Muggleton et al. | 423/136 |
| 3,244,509 | 4/1966 | Nowak et al. | 75/29 |
| 3,466,169 | 9/1969 | Nowak et al. | 423/136 |

Primary Examiner—Herbert T. Carter
Attorney, Agent, or Firm—Sheridan, Ross, Fields & McIntosh

[57] ABSTRACT

A process for recovering aluminum from fly ash containing iron, silicon and titanium which comprises: (a) chlorinating the fly ash in an oxidizing atmosphere to selectively chlorinate and vaporize iron chloride from the remaining chlorides, (b) chlorinating the residue from step (a) in a reducing atmosphere of carbon monoxide, in the presence of added silicon chloride to suppress the chlorination of silicon, and vaporizing the chlorides of aluminum, silicon, titanium, and the residual iron, (c) separating and recovering the vaporized chlorides by selective condensation, and treating the residue of step (b) with sulfuric acid to convert calcium chloride to gypsum, and to regenerate a chloridizing and binder solution for pelletizing fly ash feed.

16 Claims, 11 Drawing Figures

PROCESS FOR RECOVERING ALUMINUM AND OTHER METAL VALUES FROM FLY ASH

BACKGROUND OF THE INVENTION

Large quantities of fly ash carried by the combustion products of power plants burning pulverized coal exist throughout the country and more is being created by operation of these plants. This accumulation creates a disposal problem and represents a waste of metal values, particularly aluminum, as a typical fly ash contains up to fourteen percent aluminum by weight. Lesser amounts of iron, titanium and other useful metals are present in fly ash.

No satisfactory process exists for economically recovering aluminum from fly ash having the required purity for commercial sale because of the difficulty of separating it from other metals present in the fly ash, particularly, iron. Separation through the chlorination route to recover aluminum as aluminum chloride looks attractive, however, the process must produce an aluminum chloride of substantial purity. For example, purity requirements for aluminum chloride feed material to an Alcoa-type aluminum cell limit the $Fe_2O_3$ content of the feed to 0.03 percent. Furthermore, in the chlorination process, the chlorination of unwanted metals, such as silicon, must be suppressed to restrict the consumption of chlorine; otherwise, the process becomes prohibitively expensive.

A further problem involved in recovering the metal values from fly ash through the chlorination route, is the disposal of alkali and alkaline earth metal chlorides remaining in the final residue.

Accordingly, it is a principal object of this invention to provide a method for recovering aluminum of substantially high purity from fly ash and other materials containing iron and silica with the aluminum.

It is another object of this invention to provide a method for suppressing the chlorination of silicon when recovering aluminum as aluminum chloride from fly ash by chlorination.

It is a further object of this invention to provide a method for the disposal of alkali and alkaline earth metal chlorides remaining in the final residue resulting from the chlorination of fly ash to recover aluminum as aluminum chloride.

SUMMARY OF THE INVENTION

A process for recovering aluminum from fly ash and other materials containing iron and silicon by the chlorination route which comprises first separating iron from the remaining metals by selectively chlorinating the iron in an oxidizing atmosphere (about 5 to 100 percent added oxygen by volume) and vaporizing it followed by chlorinating the residue containing the remaining metals including aluminum, silicon, titanium, alkali and alkaline earth metals, and some iron, in a reducing atmosphere of carbon monoxide in the absence of solid carbon to suppress the chlorination of silicon, vaporizing the chlorides of aluminum, silicon, titanium and the remaining iron, separating a recovering the vaporized chlorides by selective condensation, and treating the final residue with sulfuric acid to convert calcium chloride to disposable gypsum with simultaneous regeneration of a dilute HCl solution for purposes of prechloridizing the fly ash feed and also providing a suitable binder for pelletizing the fly ash feed.

Improvements are forming the feed material into carbonfree briquettes, and introducing silicon chloride into the reductive chlorination step to further suppress the chlorination of silicon.

DESCRIPTION OF THE PREFERRED EMBODIMENTS

The invention will now be described with reference to the accompanying drawings and examples.

Figure 1:
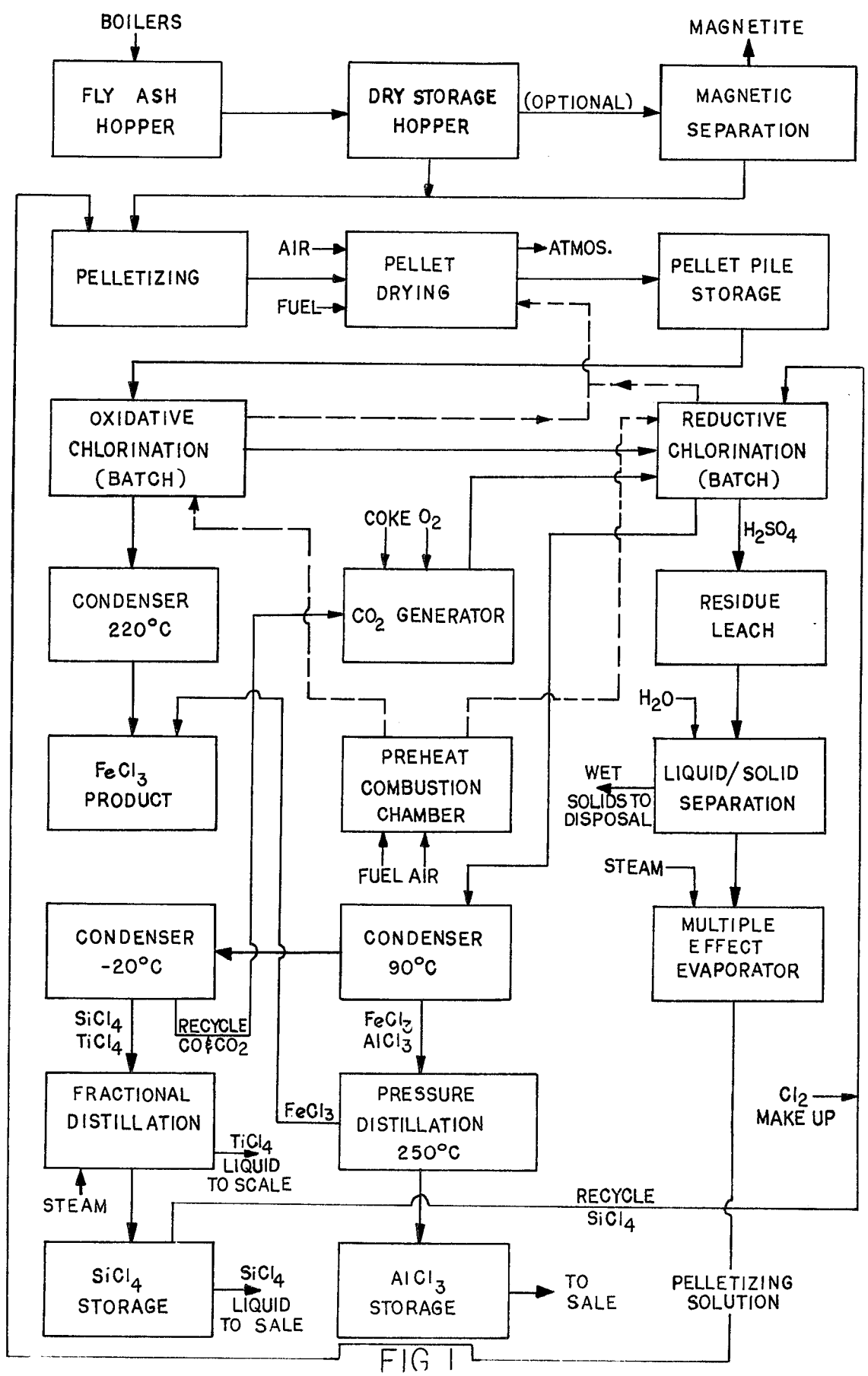
FIG. 1 is flow sheet of the complete process of the invention.

Referring to FIG. 1, the fly ash accompanying the combustion products of the boilers heated by burning of pulverized coal is collected in a fly ash hopper. The particular fly ash used in the examples set forth below was recovered from power plants using San Juan coal from the Four Corners area of the United States. Of course, the metal value content of the fly ash will vary depending upon the area in which the coal was mined.

Periodically the collected dry fly ash is transferred to a dry storage hopper.

The dry fly ash can be sent to a dry magnetic separation step. Optionally, in this step 50–60 percent of magnetite iron can be removed by magnetic separation.

The fly ash is next sent to the pelletizing step where a hydrochloric acid binder solution is added and it is pelletized into high-density, high strength pellets in conventional equipment such as a California Pellet Mill pelletizer. Following pelletizing, the pellets are dried at about 300° C. in a direct fired tunnel dryer. Dry pellets are inventoried for feed to the shaft chlorinator or furnace. The fly ash may be ground before pelletizing; however, it was found that this does not affect the recovery of the metal values. Pelletizing is mandatory for a shaft reactor. Sequential chlorination techniques are amenable to the plug-flow nature of the shaft chlorinator.

Various binders were tested for the pellets, for example, sulfuric acid, hydrochloric acid, and sodium chloride. Bentonite was tested to see if the hot strength of the pellets could be improved. The latter produces a stronger pellet if the sintering is done at 1000° C. Shaft chlorinations require a high-crush, strong pellet feed which does not lose strength during chlorination.

Carbon-containing pellets were not satisfactory. Testing showed that they lose most of their strength during chlorination while carbon-free pellets appeared to maintain their integrity throughout the chlorination and the residue pellets are about as strong as feed pellets. As will be borne out later, solid carbon was not satisfactory as a reducing agent for the reductive chlorination. Extrusion or compaction-type pelletizers were found to be the most satisfactory for low-density fly ash materials. Pellets bound with hydrochloric acid provide to be the most satisfactory although sulfuric acid is a suitable binding agent. As will be seen from the flow sheet, liquid from the sulfuric acid treatment of the final residue was recycled to the pelletizing step and this liquid containing hydrochloric acid and some small amounts of metal chlorides ueas found to be a satisfactory binder for the pellets. The data in the following Table 1 was obtained in oxidizing chlorinations of hydrochloric acid bound pellets.

Table 1

Oxidizing Chlorinations of Pelletized Fly Ash Feed

Conditions Atmosphere: $Cl_2$ 100 cc/min / $O_2$ 100 cc/min
Temperature/Time: As indicated

| Test No. | Temp. °C. | Time, min. | $Cl_2$ Stoichiometry for Fe | % Volatilization Fe | Al | Si | Ti |
|---|---|---|---|---|---|---|---|
| 1[1] | 600 | 40 | 10.3 | 13.8 | 0 | 0 | — |
| 2[1] | 700 | 40 | 10.3 | 37.0 | 0 | 0 | — |
| 3[1] | 800 | 40 | 10.3 | 61.3 | 0 | 0 | — |
| 4[1] | 950 | 40 | 10.3 | 90.1 | 0 | 0 | — |
| 5[1] | 800 | 120 | 30.9 | 69.0 | 1.6 | 0 | — |
| 6[2] | 950 | 40 | 10.1 | 90.9 | 3.6 | 3.6 | — |
| 7[3] | 950 | 30 | 6.0 | 83.0 | 0 | 0 | — |
| 8[1] | 1050 | 58 | 9.9 | 95.6 | 1.1 | 0 | 0 |

[1]Feed: 20 g. HCl-bound pellets, minus 1/4" + 6-mesh.
[2]Feed: 30 g. HCl-bound pellets rather than 20 g. $Cl_2/O_2$ ratio, 2/1 instead of 1/1 as in other tests.
[3]Feed: 20 g of HCl-bound pellets prepared from minus 325-mesh ground fly ash.

The table shows that hydrochloric acid bound pellets were satisfactory for volatilizing iron and very little aluminum, silicon and titanium, particularly at temperatures between 800° C. and 1050° C. In addition to showing the effectiveness of the chloridizing pelletization, the results also show the effect of temperature on the oxidizing chlorination, and indicate that either a higher temperature, perhaps 1150° C., or a longer reaction time would produce a fly ash residue pellet almost totally free of iron, that is, over 99 percent removal, with virtually no loss of aluminum values or excessive chlorine consumed in volatilizing silica.

Both hydrochloric acid and sulfuric acid are suitable binders for carbon-free pellet compositions. Fly ash without any binder produces a weak pellet when sintered at 300° C. The presence of carbonaceous material also reduces the pellet strength.

The pellets are dried with fuel-air or by recuperation of heat from high temperature gases exiting the oxidation chlorinator and stored pursuant to chlorination.

As seen from the flow sheet of FIG. 1, the oxidative chlorination step comes next followed by reductive chlorination. It was found that the most effective procedure was to first remove the iron by selective chlorination in an oxidative chlorination step followed by volatilization of the formed ferric chloride and its recovery by condensation. Up to 98 percent of the iron was volatilized with substantially no chlorination or volatilization of the other metal values. It is important, of course, that substantially no aluminum chloride be formed or volatilized at this stage. As one of the big economic factors involved with the process is the use of chlorine, it is also important to suppress the chlorination of the other metal values, particularly silicon, as the fly ash contains over 25 percent silicon.

It was found that the degree of silica chlorination in the reductive chlorination step can be greatly reduced by using only carbon monoxide as a reducing agent rather than a mixture of carbonaceous material and fly ash. Carbon monoxide improves the selectivity of alumina chlorination over that of silica. The injection of silicon tetrachloride into the reaction gas mixture of chlorine and carbon monoxide was found to be very effective in almost completely eliminating silica chlorination at 950° C., for example.

It was found that the overall chlorination procedure resulted in chlorination of alkali and alkaline earth metals present. Suppression of the chlorination of these elements which end up in the final residue as chlorides was not emphasized because a feasible way of disposing of the chlorides in the residue was found. It was found, however, that the best reaction conditions for minimizing chlorination of sodium and magnesium was the absence of carbon during the chlorination and chlorination at a temperature of about 950° C.

The oxidative chlorination for the selective removal of iron is preferably performed on fly ash pellets with a hydrochloric acid binder in a shaft chlorinator. Attempts to remove iron from the pellets by perchlorination under reducing or neutral conditions were not feasible because of co-chlorination of excessive amounts of alumina.

A number of shaft furnace chlorinators used as batch chlorinators is preferred. These chlorinators are operated with staggered sequence of operation designed for optimum heat recuperation. For the oxidation chlorination, the charge is brought up to the proper temperature with hot, neutral combustion gases from a coal-fired furnace. A mixture of chlorine and oxygen gases is then circulated for about three hours through the charge to prechlorinate and volatilize about 90 to 95 percent of iron content. The volatilized ferric chloride is collected in an air-cooled scraped condenser. The next step is the reductive chlorination.

Carbon monoxide gas is added to the chlorinator. The reaction with carbon monoxide is sufficiently exothermic to be self-heating. The chlorinator is operated for about four to eight hours to collect a small amount of residual iron chloride in the first stage condenser and a high purity aluminum chloride in the second stage condenser. About three percent silicon chloride by volume is injected during the reduction to suppress silica chlorination. A third-stage condenser collects the chlorides of titanium and silicon. The on-stream chlorinator is then purged with ambient air to remove residual chlorine and cool the residue. The purged gas is routed to a chlorinator coming on line for heat up and to react with the residual chlorine and silicon chloride. A preferred method of introducing the silicon chloride is to run the chlorine through the liquid silicon chloride before it enters the reactor. The cooled depleted pellets are conveyed to the leach circuit where water soluble chlorides are removed and calcium is converted to gypsum with sulfuric acid. The residue solids are filtered, washed and sent to the disposal while the hydrochloric acid solution is evaporated as required for water balance control and recycled to the pelletization step for reuse as pellet binder and perchloridizer.

Analyses of metal volatilizations set forth in the tables below were determined from feed and residue analyses.

Analysis of a typical fly ash used in the examples set forth herein is as follows:

TABLE 2

| Characterizing Fly Ash and Bottom Ash Feeds | | |
|---|---|---|
| Element | Fly Ash, % | Bottom Ash, % |
| Al | 13.9 | 14.0 |
| Si | 25.5 | 25.4 |
| Fe | 2.72 | 2.69 |
| Ti | 1.03 | 1.02 |
| Ca | 4.66 | 4.31 |
| Na | 1.05 | 1.06 |
| K | 0.694 | 0.670 |
| Mg | 0.581 | 0.491 |
| S (Total) | 0.182 | 0.116 |
| C | 1.56 | 0.34 |
| $P_2O_5$ | 0.072 | 0.053 |
| U | 0.0009 | 0.0006 |
| V | 0.009 | 0.008 |

In order to illustrate the objectives of the process, the reported purity requirements for an aluminum chloride feed material to an Alcoa-type aluminum cell are reported in Table 3.

TABLE 3

| Element | % |
|---|---|
| Al | 99.426 |
| $SiO_2$ | 0.025 |
| $Fe_2O_3$ | 0.03 |
| CaO | 0.06 |

TABLE 3-continued

| Element | % |
|---|---|
| MgO | 0.002 |
| $Na_2O$ | 0.40 |
| $TiO_2$ | 0.005 |
| $K_2O$ | 0.005 |
| $P_2O_5$ | 0.005 |

Optimum chlorination conditions of temperature, reaction time, and level of silicon tetrachloride were established for the reducing chlorinator. A silicon tetrachloride concentration in the chlorinator feed gas of three percent and a temperature of 1050° C. reduced silica chlorination to about three percent while still sustaining an alumina recovery of nearly 80 percent. Iron is controlled by selective oxidation prechlorination and also by further purification of the off gas using fractional condensing at two temperature levels. Silica, potentially a large consumer of chlorine, is almost completely rejected by use of carbon monoxide only as a reductant, that is, no solid carbonaceous additive, and by the injection of small quantities of silicon tetrachloride in the feed gas. The residue treatment, which will be outlined below, provides a method for dealing with alkali metal and alkaline earth metals.

Oxidation chlorinations were performed on a number of samples of fly ash briquettes bound with hydrogen chloride binder and the results are presented in the following Table 4.

TABLE 4

| | | Chlorination Conditions | | | | | | | | | Results | | | | |
|---|---|---|---|---|---|---|---|---|---|---|---|---|---|---|---|
| | | Chlorine | | Carbon Monoxide | | | $SiCl_4$ | | | | | | | | |
| Test No. | Wt. g | Flow cc. min | Stoich. for Element | Flow cc/min | Stoich. for Al | Oxygen Flow cc/min | Flow cc/min | Vol. % | Temp. °C. | Time min. | $Cl_2$ Efficiency Cumu. | % Volatilized | | | |
| | | | | | | | | | | | | Al | Si | Fe | Ti |
| 1. | 20 | 100 | 10.1-Fe | — | — | 100 | — | — | 950 | 40 | 5.2 | ≃0 | ≃0 | 90.1 | — |
| 2 | 20 | 100 | 10.1-Fe | — | — | 33 | — | — | 950 | 40 | <20 | 3.6 | 3.6 | 90.9 | — |
| 3 | 30 | 100 | 6.0-Fe | — | — | 100 | — | — | 950 | 30 | (−2.8) | ≃0 | ≃0 | 83.0 | — |
| 4 | 30 | 100 | 9.9-Fe | — | — | 100 | — | — | 1050 | 58 | 4.3 | 1.1 | ≃0 | 95.6 | ≃0 |

From the above results it will be seen that about 90 to 96 percent of iron was volatilization of 1 to 3.6 percent aluminum, 0 to 3.6 silicon, and no titanium. A mixture of chlorine and oxygen was used as the chlorinating gas mixture. The oxygen oxidizes the silicon to silicon dioxide and suppresses its chlorination. This also happens in the case of aluminum and titanium.

Figure 2:
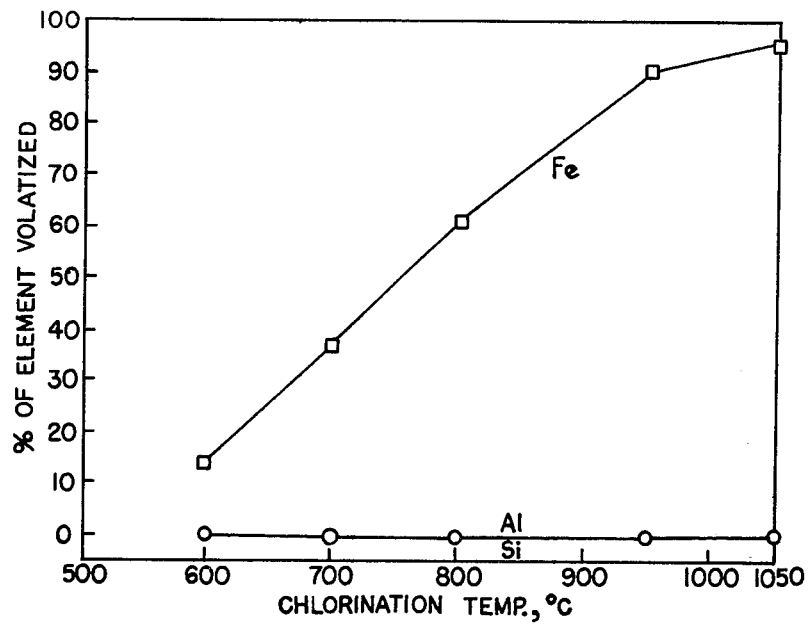
FIG. 2 is a graph based on test results of oxidation-chlorination of fly ash in which iron recovery is plotted against temperature.

FIG. 2 shows the effect of temperature on the percent of iron volatilized in accordance with the oxidizing chlorination step. It will be noted that at 1050° C. about 95 percent of the iron is recovered, indicating that a total recovery could be obtained at higher temperatures probably in the neighborhood of 1100° to 1200° C.

Figure 3:
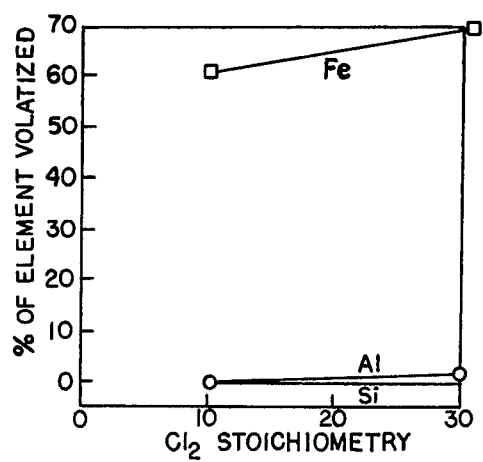
FIG. 3 is a graph based on results of oxidationchlorination of fly ash at 800° C. in which Fe, Al and Si recovery is plotted against chlorine stoichiometry.

FIG. 3 shows the percent of iron, aluminum and silicon volatilized in the oxidative chlorination step at various chlorine stoichiometries (X for Fe). Since the process recycles the chlorination off gas, the stoichiometry figures in the laboratory investigation are indicative only of the relative rates of chlorination in a short depth of pellets. Full scale chlorinator operation using recycle techniques can attain complete utilization of chlorine. The temperatures were below 800° C. It will be noted that practically no silicon or aluminum are volatilized in the procedure.

Figure 4:
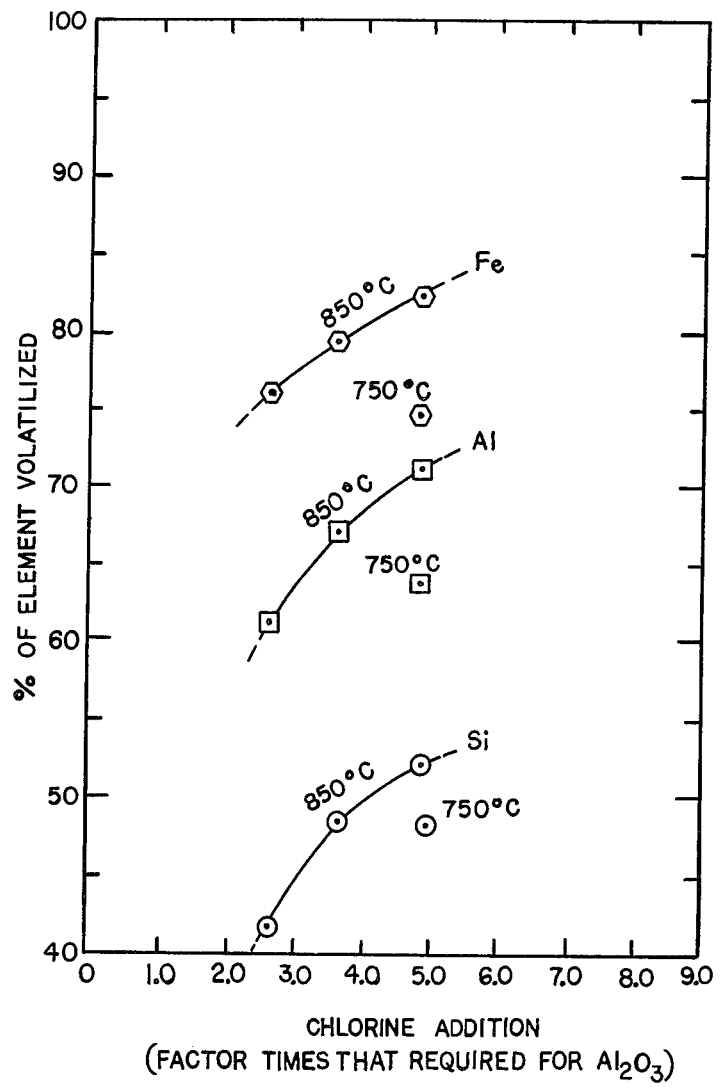
FIG. 4 is a graph based on test results of fly ash in which metal recovery is plotted against chlorine amounts at temperatures of 750° C.–850° C. showing percents of iron, aluminum and silicon volatilized as chlorides in reductive chlorination for various amounts of chlorine added using samples of fly ash which had first been subjected to oxidative chlorination.
Figure 5:
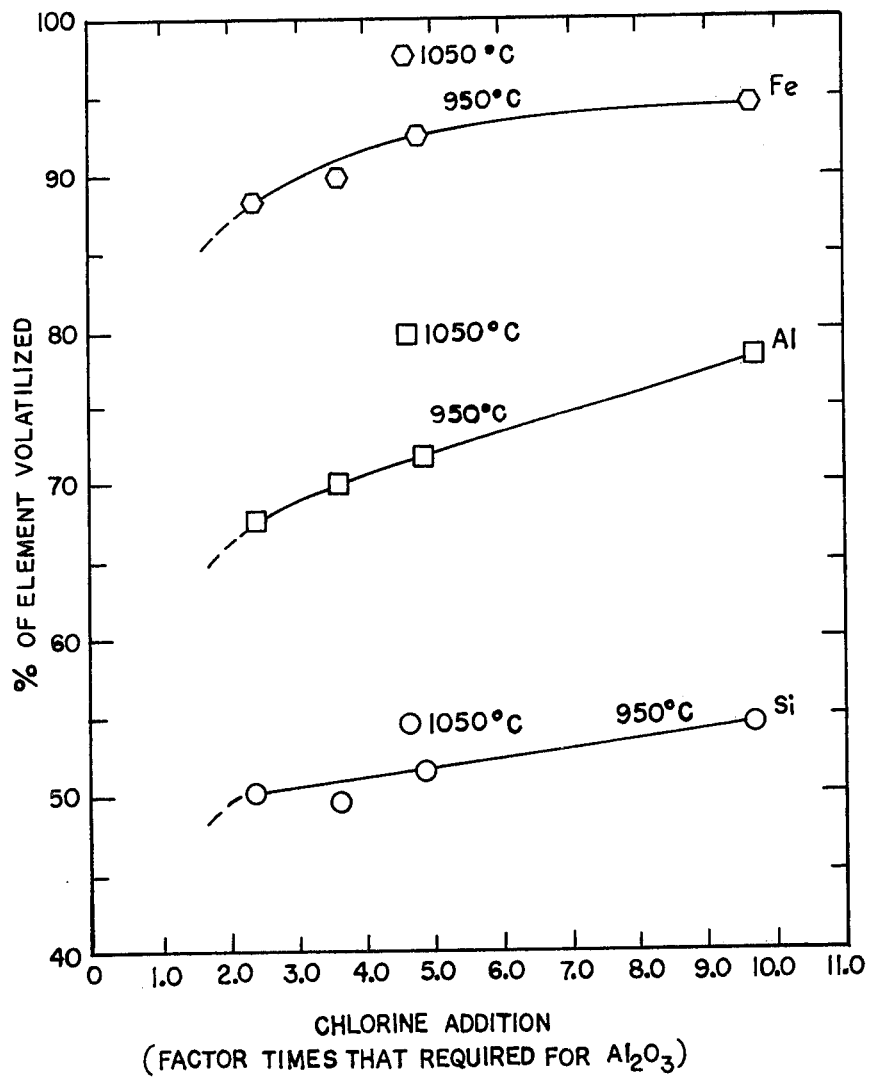
FIG. 5 is a graph like that of FIG. 2 based on results obtained at 950° C.–1050° C.

FIGS. 4 and 5 are descriptive of the degree of chlorination of aluminum, silica and iron at various temperatures and amounts of chlorine added. These results are based on tests involving neutral chlorinations, that is, neither oxidative or reductive. When the results of Table 4 are compared with these results, the effectiveness of oxidative chlorination in suppressing the chlorination of aluminum and silicon is graphically illustrated.

A number of tests using the reductive chlorination procedure described above were run on samples, one of which (Test 4) had already been subjected to oxidative chlorination, and the results are set forth in Table 5 below. Carbon monoxide was used as the sole reducing agent and it was introduced as a mixture of chlorine and carbon monoxide. The chlorine was first bubbled through liquid silicon tetrachloride which was introduced in this manner to suppress the chlorination of silicon.

It can be seen from the above results that from about 54 to about 77 percent of the aluminum, from 0 to 4.7 percent silicon, and from about 50 to about 100 percent of iron was recovered. The results illustrate the effectiveness of the process for recovering substantial percentages of aluminum and residual iron by the reductive chlorination step, with chlorination of silicon and titanium being effectively suppressed.

A number of tests were made to compare the effectiveness of solid carbon and carbon monoxide as reducing agents in the reductive chlorination step. The results of these tests are presented in the following Table 6. The results are also comparative to the use and non-use of silicon chloride as a suppressant for the chlorination of silicon. The samples had first been subjected to the oxidative chlorination step.

TABLE 5

| | | Chlorination Conditions | | | | | | | | | Results | | | |
|---|---|---|---|---|---|---|---|---|---|---|---|---|---|---|
| | | Chlorine | | Carbon Monoxide | | | SiCl$_4$ | | | | Cl$_2$ | | | |
| Test | Wt. | Flow | Stoich. for | Flow | Stoich. for | Oxygen Flow | Flow | Vol. | Temp. | Time | Efficiency | | % Volatilized | | |
| No. | g | cc.min | Element | cc/min | Al | cc/min | cc/min | % | °C. | min. | Cumu. | Al | Si | Fe | Ti |
| 1 | 30 | 220 | 13.0-Al | 100 | 5.0 | — | ≈14 | ≈4.2 | 950 | 360 | <9.8 | 55.6 | ≈0 | 89.7 | — |
| 2 | 30 | 220 | 13.0-Al | 100 | 5.9 | — | ≈24 | ≈6.9 | 950 | 360 | <13.5 | 53.8 | ≈0 | 97.0 | — |
| 3 | 30 | 220 | 13.0-Al | 100 | 5.9 | — | ≈21 | ≈6.1 | 1050 | 360 | <15.3 | 70.1 | ≈0 | 10. | — |
| 4 | 25.3 | 220 | 13.5-Al | 100 | 6.1 | — | ≈22 | ≈6.4 | 1050 | 360 | 20–30 | 71.5 | ≈0 | 49.4 | — |
| 5 | 30 | 220 | 13.1-Al | 100 | 6.0 | — | 9 | 2.6 | 1050 | 360 | — | 77.2 | 4.7 | 95.5 | — |

TABLE 6 EXAMPLES

Summary of Fly Ash Chlorinations

| Test No. | Type | Solids Charge Fly ash Wt. g | Solids Charge Carbon Wt. g | Solids Charge Carbon Stoich. | Chlorine Conditions Cl₂ Stoich. | Chlorine Conditions CO Stoich. | SiCl₄ Flow cc/min. | SiCl₄ Vol. % | Temp °C. | Time min. | Results Cl₂ Efficiency % Cumulative | Al | % Volatization Si | % Volatization Fe | % Volatization Ti | g | Chlorination Residue Assay % Al | Si | Fe | Ti |
|---|---|---|---|---|---|---|---|---|---|---|---|---|---|---|---|---|---|---|---|---|
| 1 | Monmagnetic | 30 | 6 | 2.2 | 5.0 | 2.3 | — | — | 950 | 155 | 49 | 72.9 | 52.6 | 90.2 | 79.8 | 16.0 | 7.0 | 22.8 | 0.28 | 0.3 |
| 2 | Sulfatized F.A. | 33 | 6 | 2.0 | 4.2 | 1.9 | — | — | 950 | 130 | 65 | 69.2 | 44.7 | 93.8 | 76.7 | 16.0 | 7.7 | 0.28 | 0.4 | |
| 3. | F.A. | 30 | 6 | 2.2 | 4.8 | 2.2 | ≈19 | ≈5.6 | 950 | 150 | 53.5 | 68.1 | 47.7 | 92.4 | 76.6 | 16.8 | 7.9 | 23.8 | 0.37 | 0.4 |
| 4. | F.A. | 30 | 6 | 2.2 | 4.8 | 2.2 | ≈48 | ≈13 | 950 | 150 | 56.6 | 66.9 | 49.0 | 92.0 | 62.2 | 16.2 | 8.5 | 24.1 | 0.40 | 0.7 |
| 5. | Pugged F.A. in Cl,SO₄,H+ | 32 | 6 | 2.2 | 4.0 | 1.8 | — | — | 950 | 124 | 67 | 72.2 | 53.4 | 93.4 | 60.7 | 15.9 | 7.3 | 22.4 | 0.34 | 0.6 |
| PACKED TUBE TESTS | | | | | | | | | | | | | | | | | | | | |
| 6 | HCl Pellets 1XCarbon | 40.5 | 4.3 | 1.0 | 4.0 | 1.8 | — | — | 950 | 150 | 49 | 82.8 | 45.8 | 98.6 | 72 | 18.1 | 4.8 | 27.6 | 0.08 | 0.5 |
| 7 | H₂SO₄Pellets No Carbon | 40.0 | 0 | 0 | 5.7 | 2.6 | — | — | 950 | 150 | 33.5 | 67.4 | 5.0 | 85.4 | 49.6 | 26.7 | 5.8 | 30.3 | 0.54 | 0.6 |
| 8 | HCl Pellets No Carbon | 30.0 | 0 | 0 | 11.2 | 5.1 | — | — | 950 | 300 | 18–20 | 65.6 | 22.3 | 95.6 | — | 19.0 | 6.5 | 27.1 | 0.16 | — |
| 9 | HCl Pellets No Carbon | 30.0 | 0 | 0 | 5.6 | 2.5 | — | — | 950 | 150 | 24 | 46.9 | 3.2 | 91.4 | — | 21.2 | 9.0 | 30.3 | 0.28 | — |
| 10 | HCl Pellets No Carbon | 30.0 | 0 | 0 | 11.2 | 5.1 | — | — | 1050 | 300 | 27 | 87.5 | 20.1 | 100.0 | — | 16.0 | 2.8 | 33.1 | 0.00 | — |
| 11 | Fine HCL Pellets | 30.0 | 0 | 0 | 5.6 | 2.5 | — | — | 950 | 150 | — | 55.0 | 8.9 | 94.7 | — | 20.1 | 8.1 | 30.2 | 0.18 | — |
| 12 | HCl+2x carbon Pellets | 30.0 | 7.1 | 2.0 | ≈12.5 | ≈5.7 | — | — | 950 | 300 | ≈30 | ≈89 | ≈64 | ≈98 | — | 9.1 | 3.7 | 23.4 | 0.12 | — |
| 13 | H₂SO₄ Pellets No Carbon | 30.0 | 0 | 0 | 6.0 | 2.7 | — | — | 950 | 157 | 30 | 67.2 | 5.2 | 84.7 | — | 19.7 | 5.9 | 30.8 | 0.56 | — |
| 14 | HCl Pellets No Carbon | 30.0 | 0 | 0 | 11.2 | 5.1 | ≈54 | ≈14.5 | 950 | 300 | 30 | 38.3 | ≈0.0 | 88.6 | — | 22.9 | 9.7 | 29.7 | 0.34 | — |
| 15 | HCl Pellets, No Carbon | 30.0 | 0 | 0 | 11.2 | 5.1 | ≈77 | ≈19.5 | 1050 | 300 | 27 | 45.9 | 8.2 | 96.6 | — | 22.5 | 8.8 | 27.9 | 0.11 | — |
| 16 | HCl + 2 x Carbon Pellets | 30.0 | 7.1 | 2.0 | 12.5 | ≈5.7 | ≈48 | ≈13 | 950 | 300 | ≈31 | ≈74 | ≈57 | ≈95 | — | 12.1 | 6.8 | 20.9 | — | — |

A chlorine flow rate of 220 cc/min and a carbon monoxide flow rate of 100 cc/min was used in all of the above examples.

Examples 1–6, 12 and 16, using either solid carbon alone or a mixture of solid carbon and carbon monoxide made are as follows: Percent volatilization at 950° C. versus $Cl_2$ Stoichiometry (for Al)

| Example No | Type of Pellet Feed | Volatilization, % 5.6 × $Cl_2$ stoich. | | | at 11.2 × $Cl_2$ stoich. | | |
|---|---|---|---|---|---|---|---|
| | | Al | Si | Fe | Al | Si | Fe |
| 1 | HCl Binder, no carbon, plus 6-mesh | 46.4 | 3.4 | 91.9 | 65.6 | 22.3 | 95.6 |
| 2 | HCl Binder, no carbon, minus 6-/plus 20-mesh | 55.0 | 8.9 | 94.7 | — | — | — |
| 3 | $H_2SO_4$ Binder, no carbon | 67.3 | 5.1 | 85.0 | — | — | — | as a reductant, show that silicon volatilization is not suppressed and that silicon is volatilized in amounts varying from about 45 to 64 percent. Examples 3 and 4 show that the addition of silicon tetrachloride when solid carbonaceous materials are present has very little effect on the suppression of the chlorination of silicon. Examples 7, 8, 9, 10, 11 and 13 show that the use of carbon monoxide alone is quite effective in suppressing the chlorination of silicon. Examples 14 and 15 show the effectiveness of the addition of silicon tetrachloride on the suppression of the chlorination of silicon.

As the results of Table 6 show, suppression of the chlorination of silica was almost complete.

Table 7 below provides a general summary of the results obtained by the overall process.

TABLE 7

| Process | Stage I Oxidative Prechlorination Fe Removal | Stage II Reducing Chlorination |
|---|---|---|
| Temperature | 950°—1050° C. | 1050° C. |
| Gas composition: | | |
| CO, % (vol) | 0 | 30 |
| $Cl_2$, % | 50 | 67 |
| $O_2$, % | 50 | 0 |
| $SiCl_4$, % | 0 | 3 |
| Reaction time, hr. | 1.0 | 4–6 |
| Al recovery, % | <1.0 | 70–80 |
| Fe recovery, % | 90–96 | 0–50 |
| Si recovery, % | 0 | 5–9 |
| Ti recovery, % | 0 | 80 |

Figure 6:
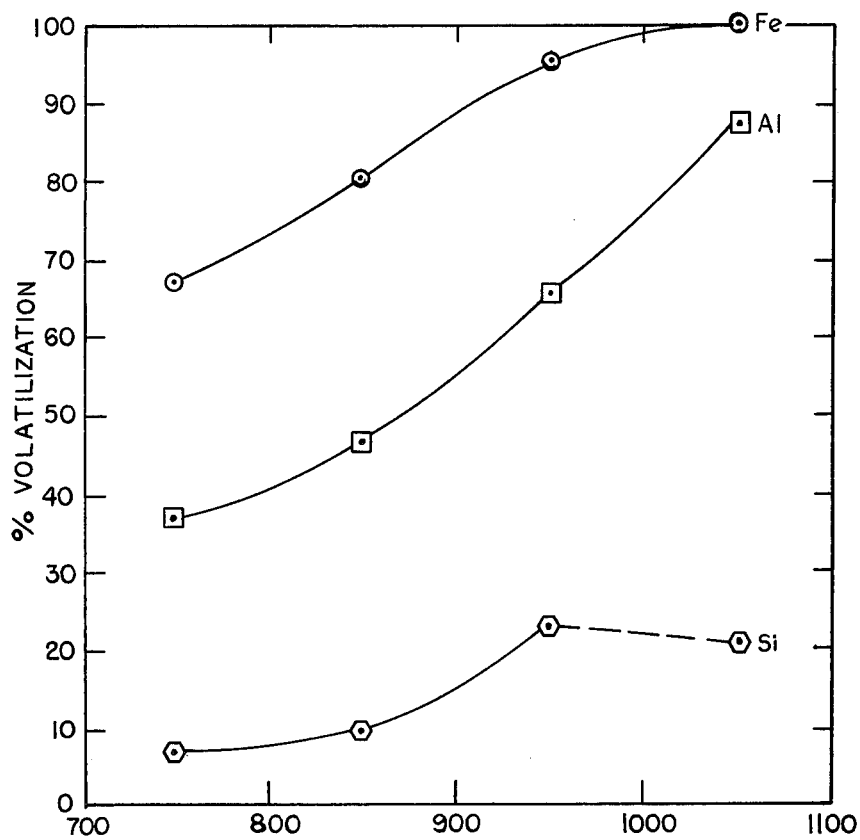
FIG. 6 is a graph based on test results of CO reductive chlorination, in the absence of carbon, performed on samples first subjected to oxidative chlorination in which percent volatilization of Al, remaining Fe and Si is plotted against temperature, the chlorine stoichiometry for aluminum being within the ranges disclosed in the specification.

FIG. 6 is a graph based on some of the data in the tables presented above. It shows the effect of chlorination temperature on the volatilization of iron, aluminum and silicon in the absence of solid carbon using carbon monoxide as the reducing agent. The experiments were performed in a six inch long packed column with fly ash pellets using a hydrochloric acid binder with no carbon. The graph also shows the effectiveness of carbon monoxide in suppressing silicon chlorination even without silicon chloride being present.

Figure 7:
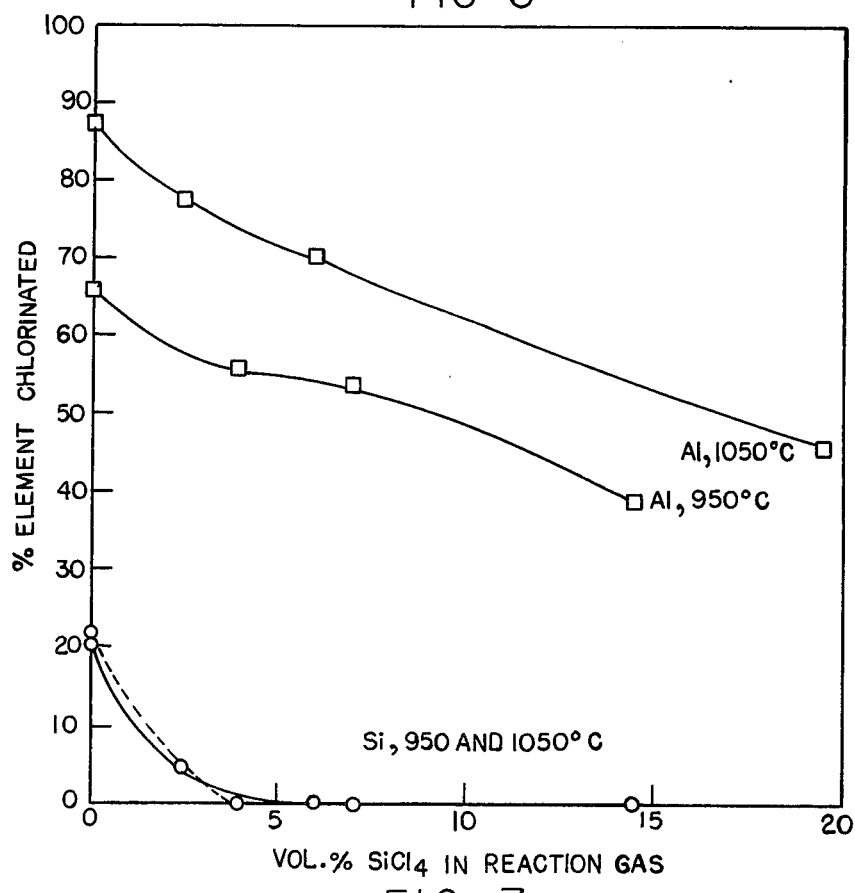
FIG. 7 is a graph based on results similar to those on which FIG. 8 below is based in which percent of Al and Si chlorinated is plotted against volume percent of added $SiCl_4$.

FIG. 7 shows the effect of the amount of silicon chloride added on the chlorination of aluminum at temperatures of 950° C. and 1050° C. Use of silicon tetrachloride in more than five volume percent would be very effective in suppressing the chlorination of silicon but substantially reduces the chlorination of aluminum.

Figure 8:
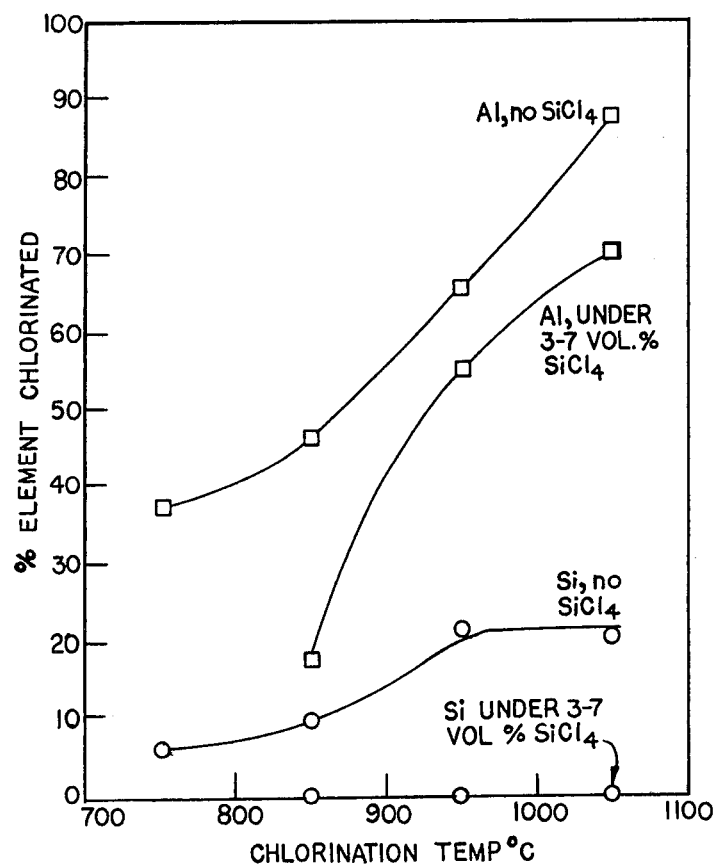
FIG. 8 is a graph based on results of CO reductive chlorination in the absence of carbon and in the presence of $SiCl_4$ in which percent element chlorinated is plotted against temperature and showing the suppression of silica chlorination at a volume percent of $SiCl_4$ under 3–7, the chlorine stoichiometry being similar to that of FIG. 6. The graph illustrates the pronounced reduction in silica reactivity with chlorine. At all temperatures tested from 750° C.–1050° C. silica was completely suppressed by injecting as little as 3.5 volume percent of silicon tetrachloride.

FIG. 8 shows the effect of the amounts of silicon tetrachloride under 3–7 volume percent in suppressing the chlorination of aluminum and silicon at various temperatures.

Figure 9:
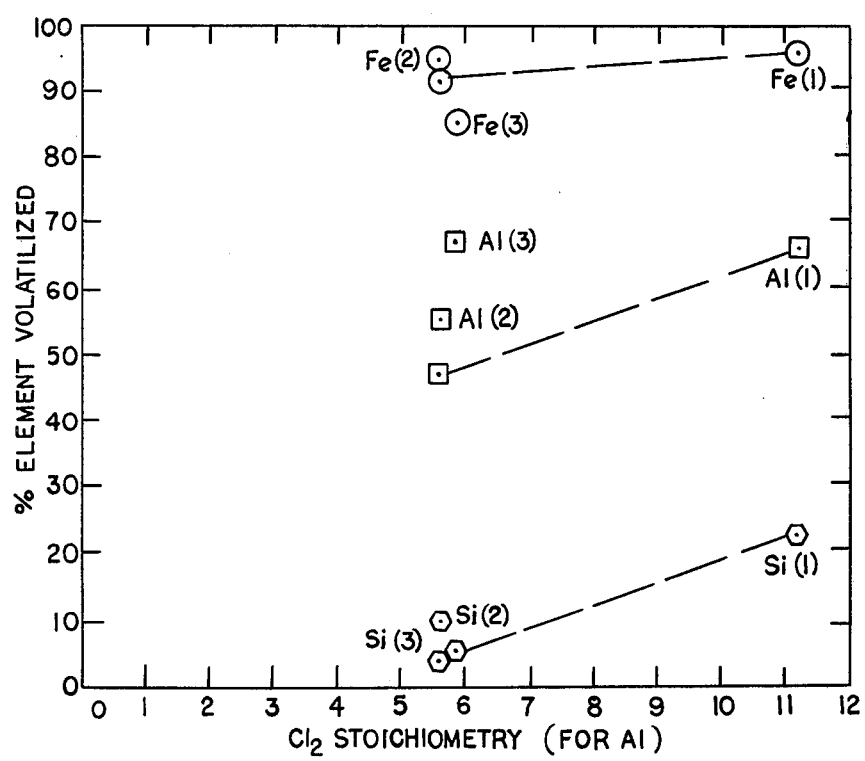
FIG. 9 is a graph of results from reductive chlorination in which percent element volatilized is plotted against chlorine stiochiometry for aluminum.

FIG. 9 shows the effect on the percent iron, aluminum and silicon volatilized at various chlorine stoichiometries for aluminum at 950° C. Various conditions of the test to obtain the results from which the graph was made are as follows: Percent volatilization at 950° C. versus $Cl_2$ Stoichiometry (for Al)

Figure 10:
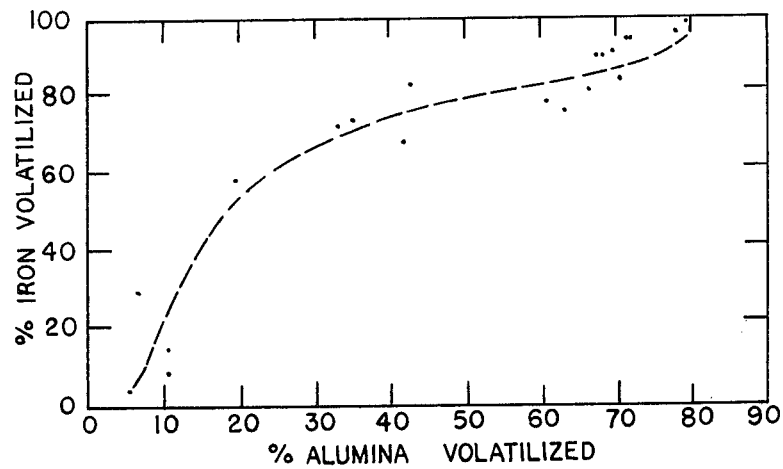
FIG. 10 is a graph based on results similar to those of FIG. 8 in which percent volatilization of alumina and iron are plotted against each other at temperatures varying between about 800° C. and 1050° C.
Figure 11:
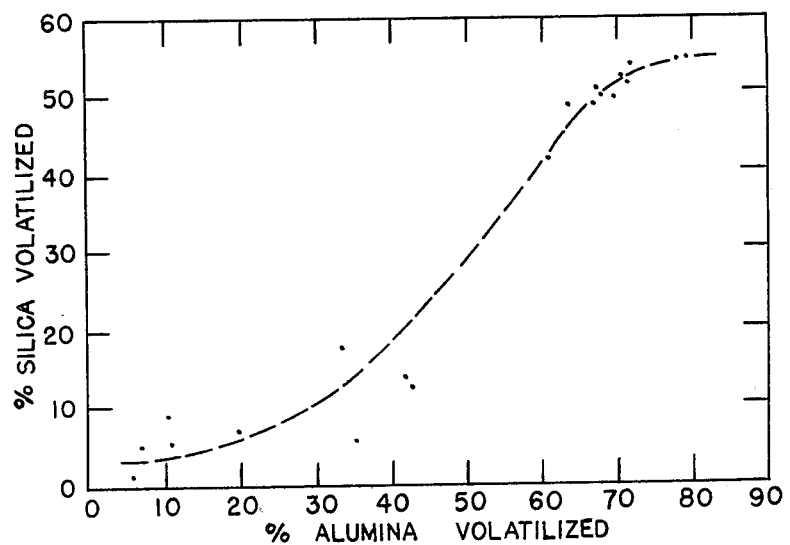
FIG. 11 is a graph based on results similar to those for FIG. 10 in which percent silica and alumina volatilized are plotted against each other.

FIGS. 10 and 11 are graphs based on a summary of the results of tests of the process set forth in the tables and other tests and they show in FIG. 10 the percent of alumina volatilized against the percent of iron volatilized and in FIG. 11 the percent of aluminum volatilized against the percent of silicon volatilized. Tests were made at various temperatures and show that there is some enrichment or improvement in the ratio of alumina chlorination to either iron or silicon over the range of alumina recovery but not to the degree that it could be used as a purification technique.

The carbon monoxide used can be regenerated using a hot coke bed such as a Wellman-Galusha carbon monoxide generator. Oxygen is added to maintain coke bed temperature at 950° C. Oxygen is preferable to air to avoid nitrogen buildup in the recycle gas. Alternatively, the recycled gas can be used as fuel either in pellet drying or the chlorinator preheat zone before going to the carbon monoxide generator.

Chlorine utilization is related to the rate of gas flow, or space velocity, with respect to bed volume. The conditions obtained in the laboratory reactor are not indicative of those which would be determined in a pilot plant. The reaction rate appears to be proportionate to bed temperature with a lesser dependence on chlorine-carbon monoxide ratio in the reaction gas. The preferred temperature range for the oxidative chlorination step is from about 500° C. to 1200° C. and the same for the reductive chlorination step.

It is seen from the above description of the invention that reductive chlorination using only carbon monoxide, that is, no solid carbonaceous additives such as coal, coke, fuel oil, or pitch results in a large improvement in rejection of silica chlorination with no loss in alumina recovery. Eliminating solid carbonaceous materials as a reductant has other advantages, such as, permitting initial oxidation chlorination of the pellet charge, increasing the strength of the pellets charged to the chlorinator as there is no loss in pellet strength during the chlorination as there is when coke, pitch or other carbonaceous material is added. The combination of a small quantity of silicon tetrachloride in the chlorination gas, for example, three percent combined with carbon monoxide, almost completely rejects silica chlorination with only a small loss in alumina recovery. Ordinarily, an oxidative chlorination followed by reductive chlorination would necessitate an intermediate addition of coke to the feed, which would be an expensive process step. Surprisingly, this was found not to be necessary in this process.

The volatilized chlorides are recovered by fractional condensation. Off-gases containing volatile chlorides are fractionally condensed at three temperature levels to produce an iron chloride product, an aluminum chloride fraction, and a liquid mixture of silicon tetrachloride and titanium tetrachloride. Ideally, $FeCl_3$, $AlCl_3$, $SiCl_4$ and $TiCl_4$ can be separated according to their relative volatilities in a series of cool condensers with high boilers condensing first. Scraped condensers in two stages collect the crude $FeCl_4$ and $AlCl_3$ fractions. A third stage condenser is chilled with a Freon refrigeration unit to condense $SiCl_4$ and $TiCl_4$. A typical test run without the oxidative chlorination step showed that two transition condensing stages produced a crude ferric chloride containing 60 percent $FeCl_3$ and 40 percent $AlCl_3$ at 170° C., and the third and fourth zone condenser stages produced a crude aluminum chloride of about 93 percent $AlCl_3$ and seven percent $FeCl_3$. Both $SiCl_4$ and $TiCl_4$ passed through the heated zones and are condensed at about −20° to −30° C. The quantative analyses to determine the recoveries set forth in the tables above were made on the condensed products. Chlorides of iron, aluminum, silica, and titanium leave the chlorinator along with unreacted carbon monoxide, chlorine and carbon dioxide, along with a small amount of particulate carryover. Staged condensing, whereby the volatile chlorides are successively removed is the best approach for selective recovery. Unreacted chlorine, carbon monoxide and carbon dioxide are recycled back to the chlorinator or CO regenerator.

Volatile chlorides are condensed in three stages. In the first stage a 220° C. scraped air condenser is used to remove most of the ferric chloride. This product may be contaminated with cocondensed $AlCl_3$, but the final product is marketable as a coagulant in tertiary sewage treatment, for example. A second stage condenser operates at 90° C. with cooling water to condense all of the $AlCl_3$ which is contaminated with some $FeCl_3$. $FeCl_3$ is removed by pressure distillation at 250° C. to provide a substantially pure $AlCl_3$ meeting the purity requirements for commercial sale. A third stage condenser operates at −20° C. for near-complete removal of $SiCl_4$ and $TiCl_4$ from the gas stream before recycle. Liquid $SiCl_4$ and $TiCl_4$ are condensed and then separated by fractional distillation.

Non-condensibles from the third stage condenser consist of chlorine, carbon monoxide and carbon dioxide, and possibly some low-boiling trace chlorides. This gas can either be burned for its heating value if the CO content is high enough and if the residual chlorine is low, or it can be recycled back to the chlorinator. Carbon monoxide and carbon dioxide can be recycled to the carbon monoxide generator.

The preheat combustion chamber for preheating the shaft reactor for both oxidative chlorination and reductive chlorination is supplied with fuel and air for heating. As seen from the flow sheet, excess heat from the chlorination steps is sent to the pellet drying step. The utilization of all excess heat in the process contributes to the latter's economic feasibility.

The low-iron, $AlCl_3$ product may be further purified by pressure distillation. The chlorides of silicon and titanium can be separated with high purity by fractional distillation. The $SiCl_4$ is a saleable product. $SiCl_4$ can be recycled to the chlorinator to act as a chlorinating agent and suppress chlorination of more silica, packaged as a saleable liquid, or burned with oxygen to produce silica fume which is a saleable product and thereby regenerating chlorine for recycle. Actually, the combined steps of prechlorination of iron and fractional condensing of the $AlCl_3$ and $FeCl_3$ in the reducing chlorination will probably make an aluminum purification step unnecessary. Silica chlorination is reduced by the process to a level where all of the $SiCl_4$ produced can be marketed.

As stated above, the chlorinations result in substantially all of the alkali metal and alkaline earth metals being completely chlorinated and these must be disposed of either by reuse or otherwise. It was found that substantially all of the calcium chloride is converted to gypsum by treatment with sulfuric acid as shown in the flow sheet. The residue from the chlorination steps is leached with dilute sulfuric acid (possibly from a $SO_2$ scrub-regeneration system on the power plant stack gas). This precipitates the calcium as gypsum, leaches out water soluble chlorides (and a small amount of acid soluble chlorides) to produce an inert refuse suitable for disposal to existing ash ponds. The leach solution contains dilute HCl, some residual $H_2SO_4$ and a very small amount of alkali metal chloride. This solution is concentrated by evaporation and sent to the pelletizing step as shown to pelletize incoming fly ash feed. A further result of the treatment is to pre-chloridize the alkaline constituents of the fly ash, mostly calcium, and thereby reduce chlorine consumption by calcium remaining in the pellets. A weak HCl solution is regenerated by the treatment of sulfuric acid with soluble calcium chloride to precipitate gypsum. The formed hydrochloric acid prechloridizes the chlorine consuming alkaline earth metals using, indirectly, inexpensive sulfuric acid, thereby reducing chlorine consumption in the process. Pellets prepared using the weak recycled HCl solution and chlorinated at typical conditions resulted in extractions similar to those using dilute reagent HCl as a binder. The above described procedure of treating the chlorination residue with dilute sulfuric acid to precipitate gypsum, using the filtrate as a fly ash binder to make pellets, and subjecting the pellets to chlorination was tested and the results recorded in Table 8 below.

TABLE 8

A. $H_2SO_4$ Leach of a Chlorination Residue

| | |
|---|---|
| Feed | 16.0 g chlorination residue |
| $H_2O$ | 16 ml (50% solids) |
| Temperature | 50° C. |
| $H_2SO_4$ | ± 4.4 g $H_2SO_4$ (required for converting all Ca + Mg to $SO_4$) |
| Final pH | 0.7, also $H_2O$ was added to make a stirrable slurry of the pasty mass formed when adding $H_2SO_4$. |

Approximate Extractions by Dilute $H_2SO_4$ Leaching with the Precipitation of Gypsum.

| Element | Extraction, % | g/l in PF |
|---|---|---|
| Al | 1.5 | 0.326 |
| Si | 0.5 | 0.256 |
| Ca | 11 | 2.14 |
| Mg | 23.5 | 0.537 |
| Na | 11 | 0.468 |
| $Cl^-$ | — | 25.8 |
| $SO_4$ | — | 33.8 |

B. Pelletizing Fresh Fly Ash with Solution from A.

| | |
|---|---|
| Feed | 30 g fly ash |
| Pug solution | 50 ml |
| Procedure | Slurry and dry overnight at 90° C. |
| Dry weight | 32 g |

C. Chlorination of the Pelletized Fly Ash Feed

| Element | % Volatilization |
|---|---|
| Al | 72.2 |
| Si | 53.4 |
| Fe | ≈93.4 |
| Ca | 70 |
| Mg | 25 |
| Na | 11 |

It is seen from the above description that an effective and economical process has been provided for recovering substantially pure aluminum, as well as other metal values, from fly ash by the selective chlorination and condensing procedure outlined above and shown in the flow sheet of FIG. 1. The process additionally provides a means for disposing of the alkali metal and alkaline earth chlorides in the residue with regeneration of hydrochloric acid which can be reused in the process. A maximum use of by-products and excess heat energy is achieved by the process of the invention.

What is claimed is:

1. A process for recovering aluminum from fly ash containing aluminum, iron and (silica) silicon which comprises:
   (a) chlorinating the material by subjecting it to the action of chlorine at a temperature of about 500° C.-1200° C. in an oxidizing atmosphere in the presence of added oxygen in an amount equal to about 5-100 volume percent of the chlorine to selectively vaporize iron as iron chloride;
   (b) chlorinating the residue from step (a) by subjecting it to the action of chlorine at a temperature of about 500° C.-1200° C. in a reducing atmosphere in the absence of solid carbon to vaporize the chlorides of aluminum (tatanium) and silicon; and
   (c) separating and recovering the formed (reacted) chlorides from the vapors by selective condensing.

2. The process of claim 1 in which the reductive chlorination of step (b) is performed in the presence of carbon monoxide as a reducing agent.

3. The process of claim 2 in which silicon tetrachloride is added to the residue from step (a) in an amount up to about 19.5 volume percent to suppress the chlorination of silicon.

4. The process of claim 3 in which the silicon tetrachloride is mixed with chlorine used as the chlorinating agent.

5. The process of claim 3 in which the reductive chlorination of step (b) is performed at about 1050° C. in the presence of silicon tetrachloride at a concentration of about 3 volume percent.

6. The process of claim 1 wherein the fly ash contains calcium and in which the material (residue of solid chlorides) from step (b) remaining after vaporization is reacted with sulfuric acid to produce disposable gypsum.

7. The process of claim 1 in which chlorine and oxygen are mixed for the chlorination of step (a).

8. The process of claim 1 in which the reductive chlorination of step (b) is performed in the presence of carbon monoxide as a reducing agent.

9. The process of claim 8 in which the carbon monoxide is introduced at a volume percent of about 20 percent to about 80 percent.

10. The process of claim 8 in which silicon tetrachloride is added to the residue from step (a) in an amount up to about 19.5 volume percent to suppress the chlorination of silicon.

11. The process of 10 in which the silicon tetrachloride is mixed with chlorine used as the chlorinating agent.

12. The process of claim 11 in which the silicon tetrachloride is introduced in an amount of about 2.5 to about 19.5 volume percent.

13. The process of claim 1 wherein the fly ash contains calcium and in which the material (residue of solid chlorides) from step (b) remaining after vaporization is reacted with sulfuric acid to produce disposable gypsum and to form hydrochloric acid.

14. The process of claim 13 in which the fly ash feed is pelletized.

15. The process of claim 14 in which the fly ash feed is pelletized and bentonite is used as a binder for the pellets.

16. The process of claim 1 in which titanium is present in said fly ash and it is chlorinated in accordance with step (b) and separated and recovered in accordance with step (c).

UNITED STATES PATENT OFFICE
CERTIFICATE OF CORRECTION

Patent No. 4,159,310        Dated June 26, 1979

Inventor(s) JAMES E. REYNOLDS, ET AL.

It is certified that error appears in the above-identified patent and that said Letters Patent are hereby corrected as shown below:

Claim 1: Column 15, line 12, delete "(silica)".

Claim 1: Column 15, line 25, delete "(tatanium)".

Claim 1: Column 15, line 26, delete "(reacted)".

Claim 6: Column 16, lines 4 and 5, delete "(residue of solid chlorides)".

Claim 13: Column 16, lines 27 and 28, delete "(residue of solid chlorides)".

Signed and Sealed this

Eighteenth Day of November 1980

[SEAL]

Attest:

SIDNEY A. DIAMOND

Attesting Officer      Commissioner of Patents and Trademarks